United States Patent [19]

Ravagnan

[11] 4,368,122
[45] Jan. 11, 1983

[54] SYSTEM FOR SEPARATING AND COLLECTING OILY MATERIALS FROM WATER EXPANSES

[76] Inventor: Giancarlo Ravagnan, Via Euganea, 33, Padova, Italy

[21] Appl. No.: 192,567

[22] Filed: Sep. 30, 1980

[30] Foreign Application Priority Data

Oct. 11, 1979 [IT] Italy .............................. 41621 A/79

[51] Int. Cl.³ ............................................. E02B 15/04
[52] U.S. Cl. .................................. 210/242.3; 210/923
[58] Field of Search ............................. 210/242.3, 923

[56] References Cited

U.S. PATENT DOCUMENTS

| | | | |
|---|---|---|---|
| 1,860,819 | 5/1932 | Schambeyer | 210/923 |
| 3,358,838 | 12/1967 | Kosav et al. | 210/242.3 |
| 4,021,344 | 5/1977 | Webb | 210/923 |
| 4,172,036 | 10/1979 | Morris | 210/242.3 |
| 4,220,533 | 9/1980 | Baer | 210/242 |

OTHER PUBLICATIONS

Article–Oil Recovery Performance etc.–Chung & Rudiger–Lockheed, p. 70.

*Primary Examiner*—Peter A. Hruskoci
*Attorney, Agent, or Firm*—Guido Modiano; Albert Josif

[57] ABSTRACT

A separating and collecting system is disclosed for separating and removing oily materials from water expanses, comprising a plurality of flanged disks arranged on a pair of powered parallel axles and adapted for operation partially immersed in the water and provided of controllably operable scraping blade pairs, at least one whereof acts to recover the material adhered to a respective disk.

10 Claims, 12 Drawing Figures

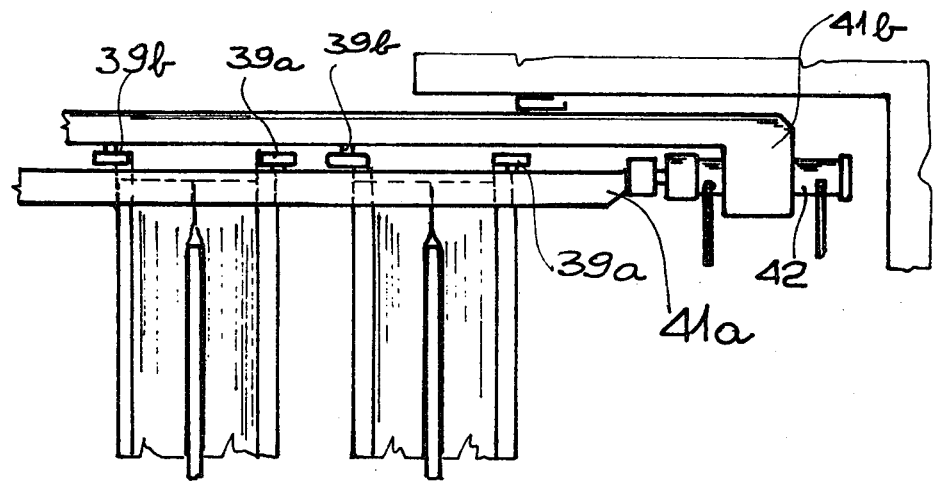
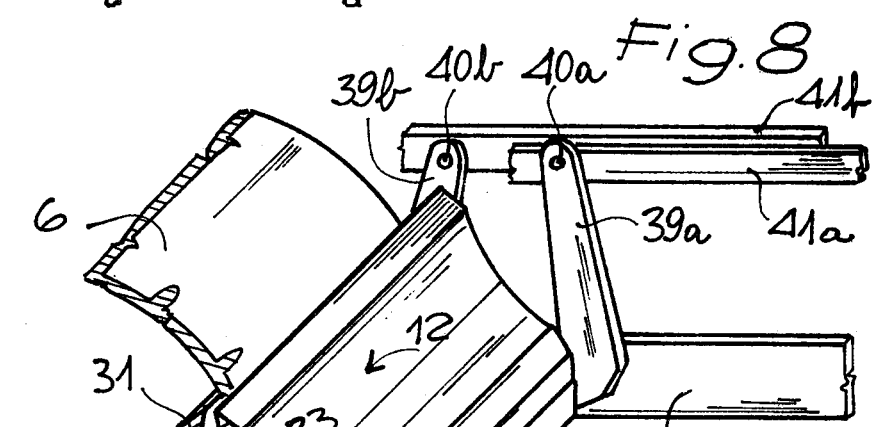
Fig. 8
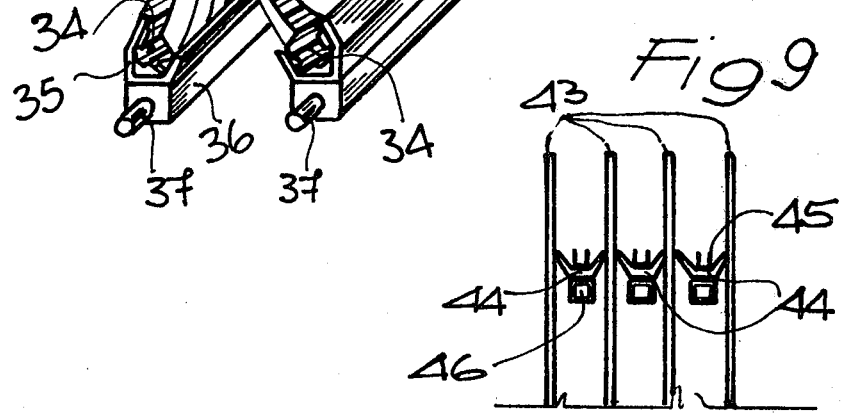
Fig. 9
Fig. 10

SYSTEM FOR SEPARATING AND COLLECTING OILY MATERIALS FROM WATER EXPANSES

BACKGROUND OF THE INVENTION

This invention relates to an improved system for separating and collecting oily materials from water expanses, both of the open kind, such as rivers, lakes, and the sea, and of the confined basin type, such as reservoirs and the like.

Known are machines and systems which, by exploiting the viscous and sticky nature of greasy or oily substances, allow the separation and recovery of such substances from water.

However, not all of the problems encountered have been satisfactorily solved, it being in particular difficult to recover substances which have spread over a very large area to form a film or thin layer, as still difficult is to attack dense product build-ups presenting hard crusts or agglomerates.

SUMMARY OF THE INVENTION

This invention sets out to provide a system which, by utilizing viscous properties and a novel technique, succeeds in collecting any type of viscous substances dispersed in water.

Within that general aim, it is possible to arrange that the system according to this invention can draw dispersed substances toward the recovery means, even where such substances form a thin film.

It is further possible to arrange that the operation of the system according to the invention can be adapted to suit the amount and quality of the substances to be picked up.

Also possible is to arrange that the system according to the invention allows such substances to be picked up with a very low content of entrained water therein.

According to one aspect of the present invention, there is provided an improved system for separating and collecting oily materials from water expanses, characterized in that it comprises a plurality of rotatory disks, arranged selectively according to at least one pair of axes of rotation offset with respect to each other, said disks being adapted for operation partially immersed in the water and provided with pairs of scraping blades or wipers set to work in a controllable manner, at least one of said pairs of scraping blades acting to recover the material adhered to a respective disk, means being further provided for adjusting the relative working positions of said axes of rotation.

BRIEF DESCRIPTION OF THE DRAWINGS

Further features and advantages of the invention will be more clearly apparent from the following detailed description of some preferred, but not limitative, embodiments thereof, given herein by way of example only and being illustrated in the accompanying drawings, where:

FIG. 8 is a plan view of the scraping blades opening and closing system;

FIG. 9 illustrates, in perspective view, how the blades are supported and moved;

FIG. 10 shows a set of disks assembled close to one another to form a pack;

DESCRIPTION OF THE PREFERRED EMBODIMENTS

Figure 1:
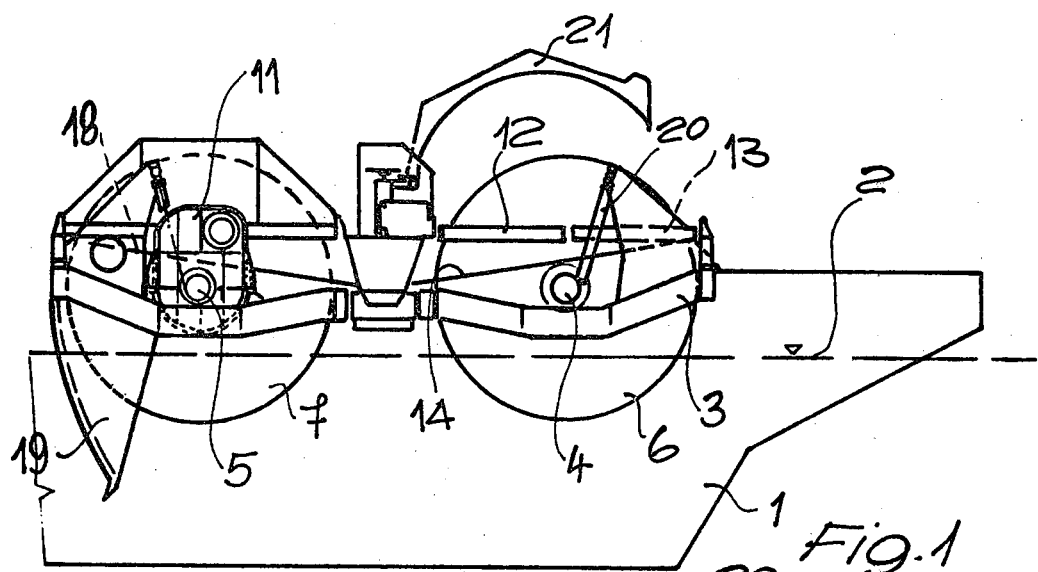
FIG. 1 is a side view of the system as mounted on a movable floating means.
Figure 2:
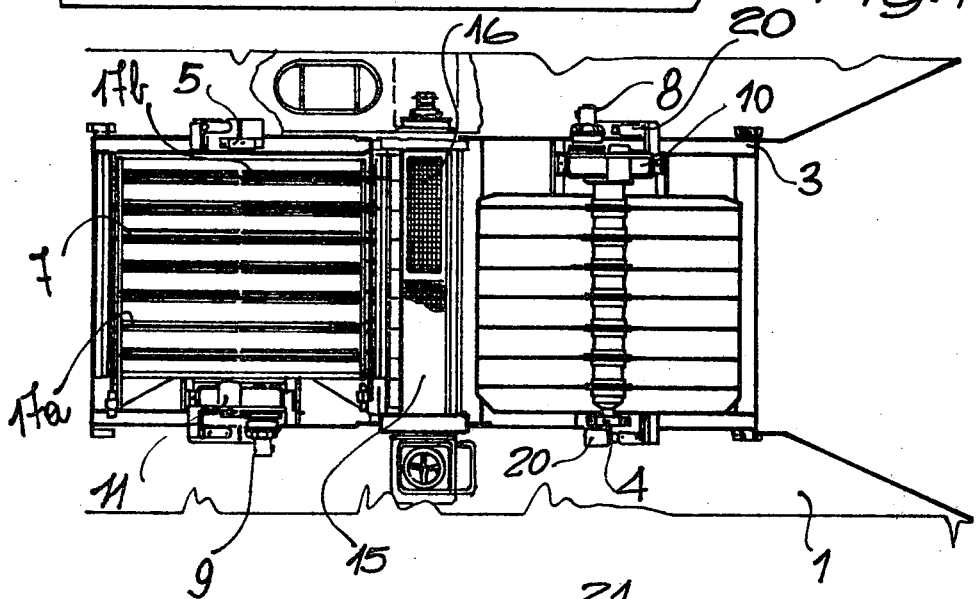
FIG. 2 is a plan view of the same system shown in FIG. 1.
Figure 3:
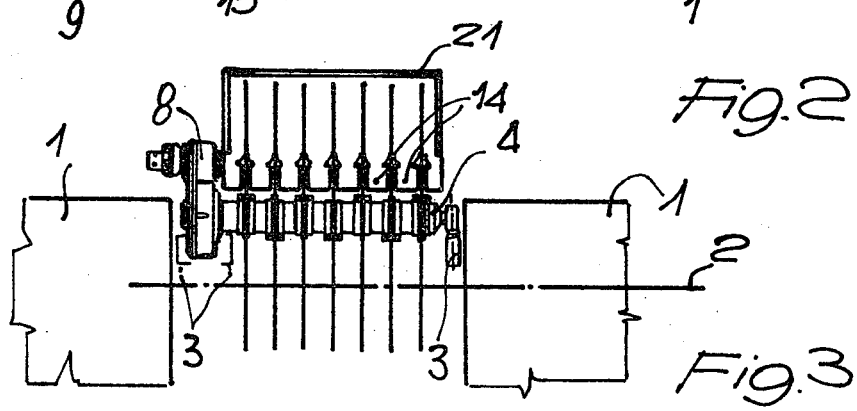
FIG. 3 is a front view of the system shown in the preceding figures.

With reference to the cited drawing figures, the system shown in the first few figures is of a type intended for installation on a movable means, which in this case is a watercraft 1, specifically a twin-hulled or "catamaran" one.

However, it will be appreciated that this same system may be mounted on floats other than self-propelled ones, or placed on a tank or reservoir employed to collect water covered with a layer of oil, this being the case particularly with tanks for collecting industrial waste water.

The self-propelled watercraft finds instead convenient application of the scrubbing of water basins, rivers, lakes and harbours, as well as to the disposal of large oil patches drifting on the open sea.

In essence, on said watercraft 1, or in any case on the floating or suspension system on the free surface of a basin indicated at 2, there is provided a strong frame 3 supporting two parallel axles, respectively a front one 4 and a rear one 5, whereon two sets of disks, respectively 6 and 7, are supported through flanged connections. The disks are preferably of stainless steel, and are rigid with their respective axles and, in operation, are held immersed in the water, being driven, in this embodiment, by hydraulic motors, 8 and 9 respectively, arranged to drive them through reduction gears 10,11.

Of course, the power drive selected may vary depending on the energy source available and on the applicational environment: quite often, in fact, the presence of oil on the water surface originates vapors from the lighter phases which are highly inflammable, thereby the use of explosion-proof motors and systems may become mandatory.

Said axles 4 and 5 have been defined front and rear axle respectively, because both in the instance of a self-propelled carrier and of a stationary system swept by a moving mass of water, the axle 4 is arranged to be the leading one, i.e. to contact the flow of water first, whereas the axle 5 is the trailing one.

Each disk 6 has on its top or upper portion two blade or wiper pairs, indicated at 12 and 13, which as will be explained hereinafter, function to scrape off and mechanically remove any materials which have stuck to the disk while the latter was submerged underwater.

These blade pairs, 12 and 13, are controllably set to work, i.e. brought to contact the disk face, alternately, according to the direction of rotation of the disks, which can be selected as desired by acting on the hydraulic motors 8 and 9.

The oily products scraped off the disks are allowed to fall along sloping conveying channels 14, which deliver them to a collector 15 equipped with a screen 16 effective to arrest solid matter whose dimensions are incompatible with the system valves and piping.

The disks 7, flanged to the axle 5, are also provided with similar pairs of blades 17a and 17b and with sloping conveying channels 18.

In addition to the above, directly downstream of the disks 7, an arcuate dam 19 is provided immersed transversally in the water, which allows a local build-up of the floating products entrained by the stream such that they cannot escape from the working area of the disks 5.

Both the disks 6 and disks 7 can be raised by means of pistons 20 fully out of the water, which is advantageous, as explained hereinafter, in order to select the most appropriate mode of operation, to gather the floating matter into the working area, and to completely remove the disks from interfering with the water flow when the carrier is to be moved at a high speed to the affected area, since in this case it is preferable to minimize drag as far as possible.

For safety reasons, both the set of disks 6 and set 7 are covered by enclosing shrouds 21 which can be raised for inspection and servicing purposes.

In addition to the blade pairs 12 and 13, each disk of the 6 type (more clearly shown in FIG. 6, where it is represented as secured with a flange 22 and through bolts 23 to the axle 4) has an additional pair of scraping blades 24 mounted in an inverted position with respect to the former blade pairs.

By means of a control device, to be described hereinafter, the various blade pairs can be engaged and disengaged from work, that is moved to contact the disk and moved away from the disk.

Figure 4:
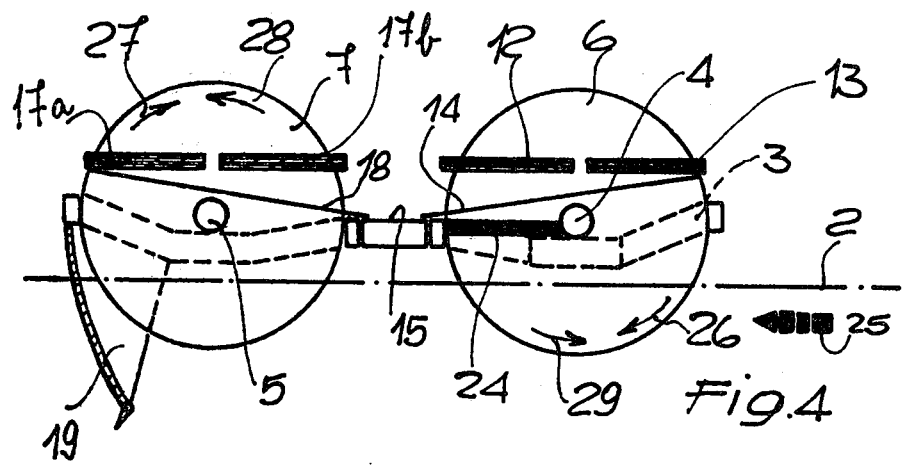
FIG. 4 illustrates schematically the arrangement of the scraping blades and rotating disks.

With reference to FIG. 4, in normal operating conditions, the liquid will flow in the direction of the arrow 25, whether the flow is originated by the water moving past or the carrier starting to move. In this condition, the disk 6 will be rotated in a clockwise direction (as referred to FIG. 4 and indicated by the arrow 26).

The blade pairs 24 and 12 will be opened, whereas the blades 13 are engaged to scrape off the product, remove it from the disk 6, and convey it toward the collecting channels 14.

The disk 7 can be rotated either in a clockwise rotation, i.e. in the direction of the arrow 27, in which case the blades 17a will be set to work, or in a counterclockwise direction, i.e. in the direction of the arrow 28, when the blades 17b are set to work instead.

In the former case, there will occur a build-up of product toward the dam 19, which serves as a means of stopping the floating matter, whereas in the latter case, it functions to clear the area between the disks 7 and dam 19, or to remove any excessive build-up of product at that area.

In the same general conditions, the disks 6 can be rotated in a counterclockwise direction, that is in the direction of the arrow 29, with the accompanying engagement of blades 12, in which case the product at the area included between the disks 6 and 7 will be recovered.

The set of disks 6 may also function to bring the disks 7 closer together, by rotating them in a clockwise direction (arrow 26) to open the blade pairs 12 and 14 and close the blades 24 which blades, being inclined in the opposite direction to the disk rotation, will repel the product toward the working area of the disks 7.

Figure 5:
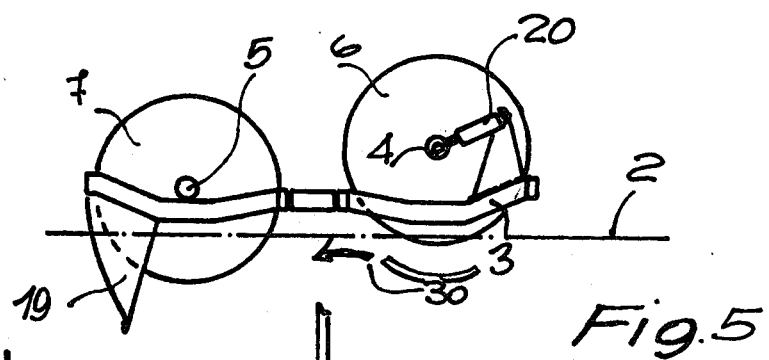
FIG. 5 illustrates the system in a further operational mode thereof.

A further mode of operation is illustrated in FIG. 5, where the disks 6 are being operated in a raised position to just skim the surface 2 of the water, thus creating an inward stream, as indicated by the arrow 30, which urges the product, even if in small layers, toward the disks 7, which will pick it up.

The blades 12 (FIG. 7) have a wedge-like cross-section 31 at their region of contact with the disk 6, followed by a portion 32 of almost constant thickness and formed at intervals with reinforcing ribs 33, and are terminated with a widening head 34 intended for insertion into a C-like groove in the supporting sectional member 35. Said supporting sectional member 35 is rigid with an additional square sectional member 36, to the heads whereof pivot pins 37 are attached which are journalled in the machine frame 38.

Figures 6, 7:
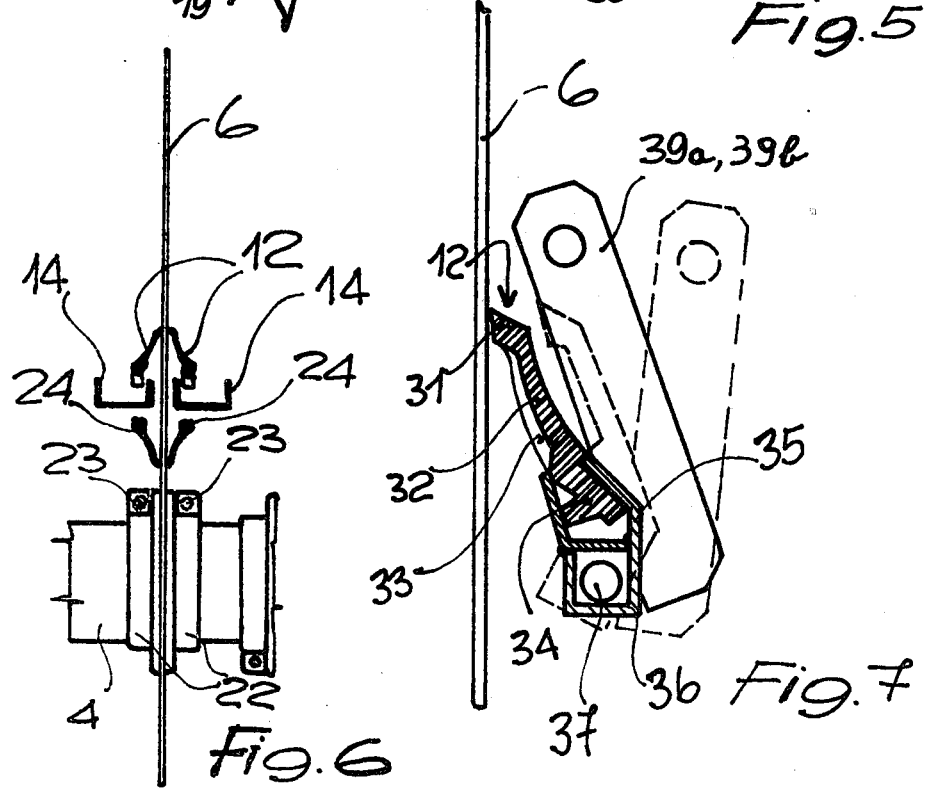
FIG. 6 is a front view of a disk with two pairs of scraping blades.
FIG. 7 shows a blade and its movable support assembly.

As visible from the drawing FIG. 7, the pivot pins 37 extend parallel to disks 6.

On one side, namely to the side adjacent the peripheral edge of the disk 6, there is attached to said square sectional member 36 a lever, indicated at 39a and 39b, for the two blades 12 which act on the disk 6.

All of the levers 39a (which are all located on the same side with respect to the disks) are connected through a tooth or prong 40a to a bar 41a, whilst all the other levers 39b are connected, through teeth or prongs 40b, to a second bar 41b.

A double-acting piston/cylinder 42 has its cylinder body connected to the bar 41b and its rod connected to the bar 41a and parallel thereto, such that when the rod is extended, a mutual displacement of the bars 41a and 41b occurs, resulting in the blades or wipers 12 being closed against the disks 6, whereas upon withdrawing the rod, the blades 12 are moved apart. It will be appreciated that the levers 39a, 39b and the bars 41a, 41b constitute a transmission mechanism for transmitting the motion generated by said piston cylinder assembly 42 to said wipers 12.

With this control system, the blades to be set to work are selected, and since the piston/cylinder 42 is only connected to the bars 41a and 41b, it is enabled to follow any irregular movement of the disks 6 while keeping the blades 12 closed.

In special conditions, or for special materials floating on the water, a particular arrangement of the disks is utilized which is called "disk pack" arrangement, i.e. an arrangement comprising a plurality of thin and close together disks 43. In this case, U-like scraping blades 44 would be used which engage simultaneously the confronting surfaces of two contiguous disks, and which in cooperation with supporting sectional members 45 and 46, also define the collecting channel for the products being scraped.

In many cases, the oily materials floating at the surface of open waters thicken into masses of considerable hardness, which form real hardpans.

Figure 11:
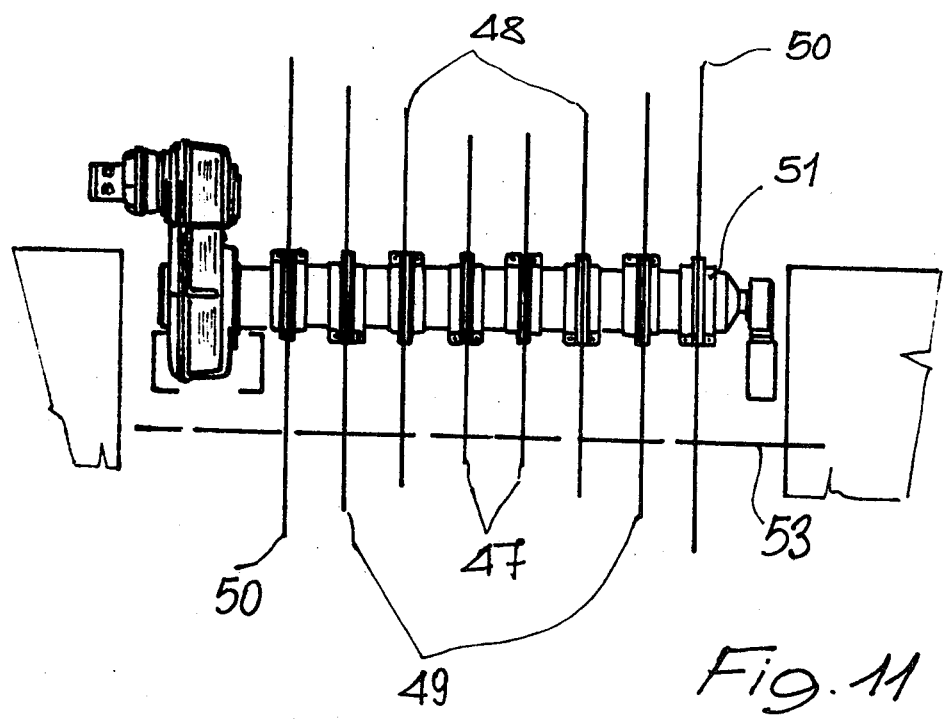
FIG. 11 is a plan view of a set of disks having different diameters.
Figure 12:
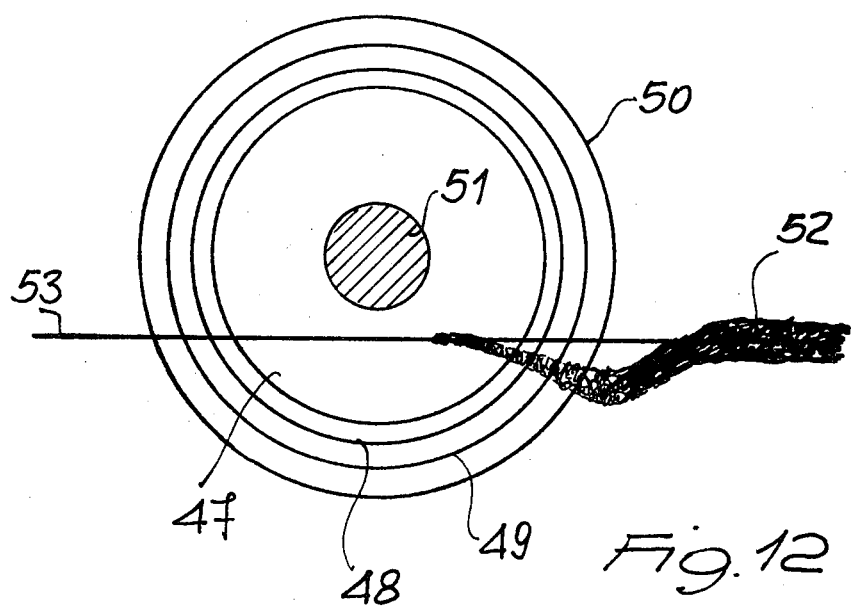
FIG. 12 is a side view of the set of disks of FIG. 11 evidencing how an oily hardpan is attacked.

In that case, it is provided that the disks, which make up the set breasting the formation first, have different diameters. As shown in FIGS. 11 and 12, the diameters increase gradually from the disks 47 to the disks 50.

Such disks 47, 48, 49, 50, which are flange connected to a common axle 51, have different peripheral speeds which are proportional to their radii, thereby on meeting a hardpan 52 at the surface of the water 53, they will attack it at different local rates, thus deforming and breaking it.

In this manner, one can handle agglomerates of smaller size more easily.

From the foregoing description, it will be appreciated that a system according to this invention is extremely versatile and functional, and capable of adapting itself to any working situation in accordance with the type and amount of the product to be recovered, as well as with the installation conditions of the machine itself.

By providing a plurality of scraping blade pairs at each disk, the possibility of varying the direction of rotation, speed and immersion or draft of the disks to suit individual application requirements, the "packed" or varied diameter feature of the disks affords a solution for any working conditions.

Obviously, the materials, dimensions, and arrangements may be any ones, depending on necessity.

I claim:

1. A system for separating and collecting oily materials from water expanses, including a frame, at least one axis of rotation supported on said frame, a plurality of rotatory disks arranged side by side on said at least one axis of rotation, said disks being adapted for operation partially immersed in the water and having each at least one pair of wiper members set to work in a controllable manner, at least one of said wiper members acting to recover the material adhered to a respective disk, means being further provided for adjusting the relative working positions of said axes of rotation, and wherein according to the improvement the system further comprises a controlling mechanism for opening and closing said wiper members with respect to the respective disk member thereby to alternatively clear said wiper members away from the disk surface and alternatively press said wiper members against said disk surface, said controlling mechanism comprising a power cylinder assembly and a transmission mechanism for transmitting the motion generated by said power cylinder assembly to said wiper members and cause selectively the opening and closing thereof, with respect to said disk surface, said transmission mechanism comprising for each wiper member a pivot pin supported on said frame and extending parallel to the respective disk member, and a lever mechanism connected to said pivot pin for imparting an angular rotation to said pivot pin thereby to selectively press said wiper members against said disk surface and respectively clear away said wiper member from said disk surface.

2. An improved system according to claim 1, characterized in that said disks are made of stainless steel and are flange connected to two parallel and close together powered axles, said axles being mounted on a frame carried by buoyant devices selected among floats or watercraft or suspension devices.

3. An improved system according to claim 2, characterized in that the disks on the first axle, namely that axle in said pair which is the leading one with respect to the water flow carrying at the surface the materials to be removed, are provided with three pairs of wiper members, two pairs being located substantially at an upper position and aligned to scrape off the adhered material and convey it over collecting channels, and one pair being arranged in an inverted position to remove said material from the disk and cause said material to partly fall into the working area of the set of disks flange connected to the second axle in said pair.

4. An improved system according to claim 3, characterized in that, downstream of the set of disks on said second axle, there is provided a transversally arranged bucket-like dam adapted to be half-submerged and arrest and gather the materials entrained by the relative motion of the water which have moved past and beyond said disks on said second axle.

5. An improved system according to claim 2, characterized in that said axles are effective to be raised to vary the immersion of said disks in the water, and in particular such as to bring the set of disks on the first axle to skim the surface of the water thereby, on increasing the rotational speed, a surface stream can be created and directed to the second set of disks.

6. An improved system according to claim 2, characterized in that said disk-carrying powered axles are driven by hydraulic motors adapted for varying the rpm's and direction of rotation of said disks.

7. An improved system according to claim 1, characterized in that said disks are packed or arranged very close together, through the spaces left between the disks there being inserted a double U-like blade serving both as a wiper and conveying channel.

8. An improved system according to claim 2, characterized in that the disks flange connected to a common axle have different diameters, decreasing toward the middle portion of said axle, and consequently different peripheral speeds to break hardpans of floating oily material along cleavage planes thereof.

9. A system according to claim 1, wherein said wiper members are arranged in pairs and located on opposite sides of the respective disk and wherein said controlling mechanism comprises for each wiper member a pivot pin supported on said frame and extended parallel to the respective disk member and for each wiper member a lever connected with one end thereof to said pivot pin and extending transverse thereto, the other end of said lever having a bar member hinged thereto and extending in a plane perpendicular to said pivot pin and wherein said controlling mechanism further comprises a power cylinder having a body and a piston member movable with respect to said cylinder body and having a piston rod extending substantially parallel to said bar member and wherein said piston body is connected to one of said bar members and said piston rod is connected to the other of said bar members, thereby to move said bar members in opposite directions, when the power cylinder is actuated, to thereby open and close said wiper members simultaneously on opposite sides of the respective disk.

10. A system for separating and collecting oily materials from water expanses, including a frame, at least one axis of rotation supported on said frame, a plurality of rotatory disks arranged side by side on said at least one axis of rotation, said disks being adapted for operation partially immersed in the water and having each at least one pair of wiper members set to work in a controllable manner, at least one of said wiper members acting to recover the material adhered to a respective disk, means being further provided for adjusting the relative working positions of said axes of rotation, and wherein according to the improvement the system further comprises a controlling mechanism for opening and closing said wiper members with respect to the respective disk member thereby to alternatively clear said wiper members away from the disk surface and alternatively press said wiper members against said disk surface, said controlling mechanism comprising a power assembly and a transmission mechanism for transmitting the motion generated by said power assembly to said wiper members and cause selectively the opening and closing thereof, with respect to said disk surface, the transmission mechanism comprising for each wiper member a pivot pin supported on said frame and extending parallel to the respective disk member, and a means connected to said pivot pin for imparting an angular rotation to said pivot pin.

* * * * *